(12) United States Patent
Sendurpandian et al.

(10) Patent No.: US 11,765,418 B1
(45) Date of Patent: Sep. 19, 2023

(54) SEAMLESS TRANSCODE SERVER SWITCHING

(71) Applicant: Twitch Interactive, Inc., San Francisco, CA (US)

(72) Inventors: Selvanayagam Sendurpandian, Livermore, CA (US); Xiangbo Li, San Diego, CA (US); Benjamin Hirsch, San Francisco, CA (US); Nagendra Akula Suresh Babu, San Jose, CA (US); Alex Converse, Oakland, CA (US); Alex Battaglia, San Francisco, CA (US); Sangmook Jung, Fullerton, CA (US); Luke Curley, El Cerrito, CA (US); Rohit Puri, Saratoga, CA (US); Yueshi Shen, Cupertino, CA (US); Tarek Amara, Pleasanton, CA (US)

(73) Assignee: Twitch Interactive, Inc., San Francisco, CA (US)

( * ) Notice: Subject to any disclaimer, the term of this patent is extended or adjusted under 35 U.S.C. 154(b) by 0 days.

(21) Appl. No.: 17/362,767

(22) Filed: Jun. 29, 2021

(51) Int. Cl.
*H04N 21/262* (2011.01)
*H04N 19/40* (2014.01)
(Continued)

(52) U.S. Cl.
CPC ....... *H04N 21/26258* (2013.01); *A63F 13/86* (2014.09); *H04N 19/40* (2014.11);
(Continued)

(58) Field of Classification Search
CPC ............. H04N 21/26258; H04N 19/40; H04N 21/2187; H04N 21/234309; H04N 21/8455; A63F 13/86
See application file for complete search history.

(56) References Cited

U.S. PATENT DOCUMENTS

2013/0054827 A1 2/2013 Feher et al.
2013/0117418 A1 5/2013 Mutton et al.
(Continued)

OTHER PUBLICATIONS

U.S. Appl. No. 17/362,724; Non-Final Office Action; dated Sep. 15, 2022; 17 pages.
(Continued)

*Primary Examiner* — Anthony Bantamoi
(74) *Attorney, Agent, or Firm* — BakerHostetler

(57) ABSTRACT

A video streaming service may include a segmentation component that provides segment metadata that indicates starting locations for a plurality of segments of video content that are produced during transcoding of the video content. The segment metadata may be sent to a first transcode server and a second transcode server to allow alignment of segmentations between the first transcode server and the second transcode server. This may allow transcoding of the video content to be seamlessly switched from the first transcode server to the second transcode server, during transmission of the video content, without causing interruption of playback. The first transcode server and the second transcode server may also operate in parallel to produce different versions of the video content, such as versions encoded using different codecs. A video player may seamlessly switch between these different codec versions without causing interruption of playback.

20 Claims, 8 Drawing Sheets

(51) Int. Cl.
*A63F 13/86* (2014.01)
*H04N 21/2343* (2011.01)
*H04N 21/2187* (2011.01)
*H04N 21/845* (2011.01)

(52) U.S. Cl.
CPC . *H04N 21/2187* (2013.01); *H04N 21/234309* (2013.01); *H04N 21/8455* (2013.01)

(56) References Cited

U.S. PATENT DOCUMENTS

| | | | |
|---|---|---|---|
| 2014/0139733 A1* | 5/2014 | Maclannis | |
| 2016/0191961 A1 | 6/2016 | Fisher et al. | |
| 2017/0223394 A1* | 8/2017 | Gavade | H04N 21/234309 |
| 2018/0302452 A1 | 10/2018 | Pantos et al. | |
| 2020/0358835 A1* | 11/2020 | Cezano | H04L 65/4048 |

OTHER PUBLICATIONS

U.S. Appl. No. 17/362,724; Final Office Action; dated Feb. 8, 2023; 18 pages.
U.S. Appl. No. 17/362,724, filed Jun. 29, 2021, Sendurpandian et al.

* cited by examiner

SEAMLESS TRANSCODE SERVER SWITCHING

CROSS-REFERENCE TO RELATED APPLICATIONS

This application is related to the following application, which is hereby incorporated by reference in its entirety: U.S. patent application Ser. No. 17/362,724 filed Jun. 29, 2021, entitled "SEAMLESS TRANSCODE SERVER SWITCHING".

BACKGROUND

Over the past few years, video streaming has become increasingly widespread. In many streaming environments, video may be sent from a source to a viewer via an intermediary, such as an intermediary video streaming service. One common example in which this may occur relates to video game streaming. For example, a video game player may sometimes capture video of himself or herself playing a video game, such as using video capture software. The game player may then transmit this video to a video streaming service, which, in turn, may transmit the video to remote viewers. In these and other scenarios, the intermediary (e.g., video streaming service) may often transcode the video content. In a transcoding process, video may be decoded from a first format and then re-encoded into a different format. As a specific example, a video streaming service may decode video content received from a video game player. The video streaming service may then re-encode the video content into a different format (and in some cases multiple different formats) for transmission to viewers. The process of transcoding the video content may be performed by transcode servers, which may produce transcoded video segments and playlists that correspond to the transcoded video segments. The playlists may be provided to video players and may be used by the video players to request the transcoded video segments. The video players may then request and receive the transcoded video segments and then play the video content.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
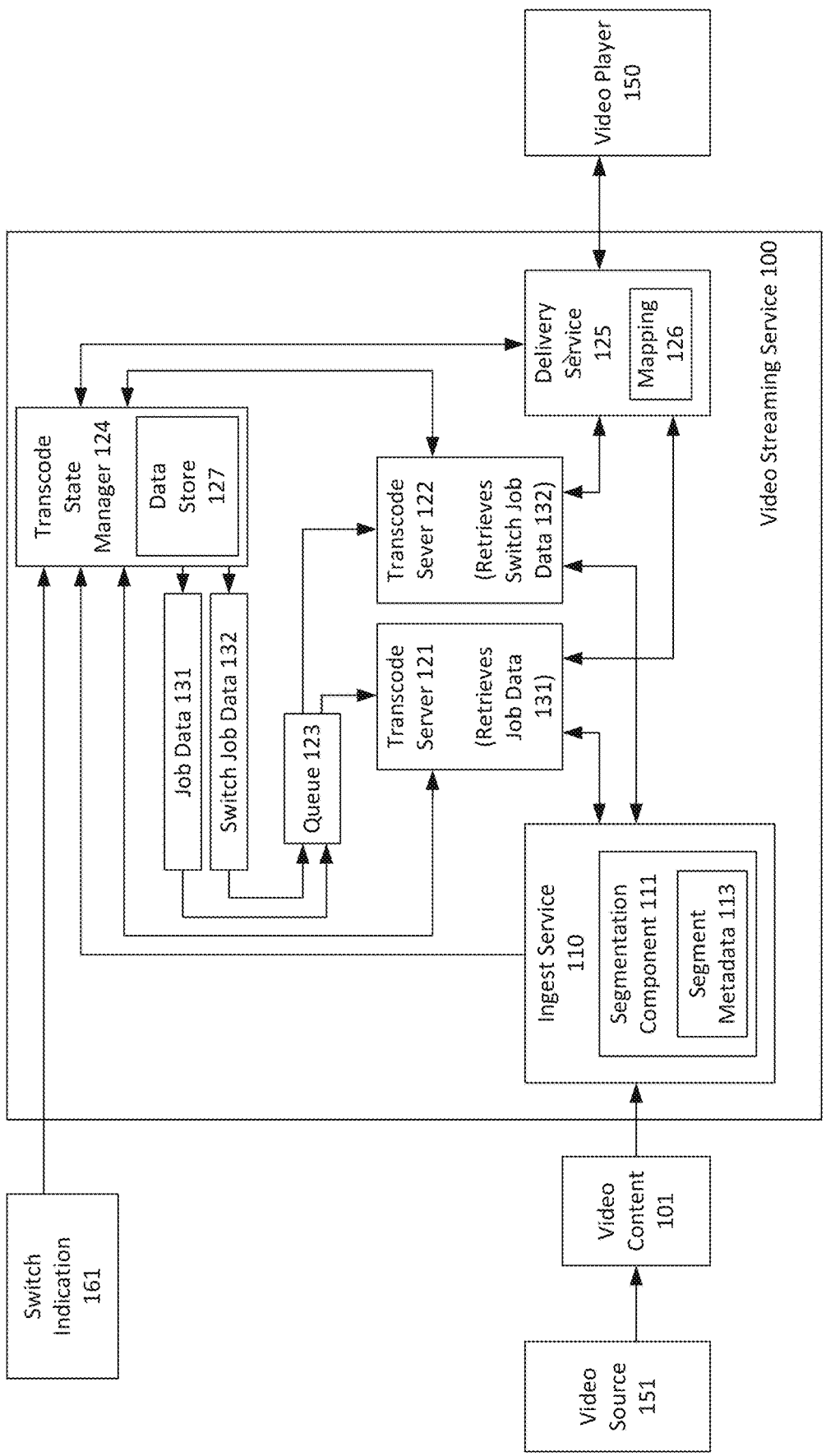
FIG. 1 is a diagram illustrating an example transcode server switching system that may be used in accordance with the present disclosure.

Techniques for seamless transcode server switching are described herein. In some examples, video content may be transmitted from a video source to a video streaming service, which, in turn, may transmit the video content to one or more viewers. For example, a video game player may sometimes capture video of himself or herself playing a video game, such as using video capture software. The game player may then transmit this game video from his or her computer, which may be the video source, to a video streaming service. The video streaming service may, in turn, transmit the game video to large quantities of remote viewers. The video streaming service may transcode the video content by decoding the video content from a first format and then re-encoding it into a different format. The process of transcoding the video content may be performed by transcode servers, which may produce transcoded video segments and playlists that correspond to the transcoded video segments. The playlists may be provided to video players and may be used by the video players to request the transcoded video segments. The video players may then request and receive the transcoded video segments and then play the video content.

The video content may be transmitted and played using streaming techniques, in which portions of transmitted content are received and played while subsequent portions of the transmitted content are being transmitted. In some examples, the video content may be live streaming content. The term live streaming, as used herein, refers to scenarios in which video content of an event (e.g., a video game) may be transmitted to viewers, and at least part of the video content may be played while the event is still occurring (e.g., while the video game is still being played by the players), albeit with some small amounts latency between the time that video content is captured and the time that the video is eventually played to viewers.

In some existing transcoding techniques, a single transcode server may produce transcoded segments and playlists for a given video stream. However, there are many scenarios in which it may be desirable to switch transcode servers during a transmission. For example, in some cases, it may be advantageous to temporarily or permanently remove a given transcode server from operation, such as to upgrade firmware on the transcode server, to better consolidate jobs among a smaller quantity of transcode servers, or for other reasons. In some examples, streaming transmissions may have long time durations (e.g., potentially multiple days), thereby causing a potentially long time delay until a given transcode server can be removed from operation. Additionally, in some examples, it may be desirable to change a video transcode configuration (e.g. preset, bitrate etc.) dynamically while transmitting. In some examples, a given transcode server that is currently transcoding a video stream may be incapable of supporting the new transcode configuration, thereby requiring the use of a different transcode server. Furthermore, in some examples, a recipient of a transmission may wish to switch between different video codecs (e.g., H.264, H.265, etc.) during a video transmission, which may also require a switch from one transcode server to another.

One problem related to some existing transcoding techniques is that switching a transcode server during a transmission may cause interruption of playback, such as by causing a current playback session on a current transcode server to be terminated and causing a new transcode playback session on a new transcode server to be initiated. One reason for this playback interruption is that the current transcode server (i.e., the transcode server from which the transmission is being switched) and the new transcode server (i.e., the transcode server to which the transmission is being switched) may not be synchronized. In particular, when transcoding video content, the video content may be segmented into multiple video segments, which are portions of video content that include multiple frames and that are requested by video players using a playlist. One challenge associated with this process is that different video segments may have different sizes. Thus, when switching transcode servers, the segmentation of a current transcode server may not be aligned with the segmentation of the new transcode server.

The techniques described herein may alleviate these and other problems by allowing for seamless switching of transcode servers, such as without interrupting playback of the video content. In order to allow for seamless switching of transcode servers, the techniques described herein may employ a segmentation component that divides the video content into segments. The segmentation component may be external to the transcode servers and may communicate with multiple different transcode servers, thereby allowing segmentation of the video content to be aligned across multiple transcode servers. In some examples, the segmentation component may be operated by an ingest service that receives the video content from the video content source (e.g., from a game player's computer). In some examples, the segmentation component may generate segment metadata that may be sent, along with the incoming video content stream, to any of one or more transcode servers that are transcoding the video content. In particular, based on a segmentation algorithm, whenever the segmentation component decides to start a new segment, it may generate and send a segment start metadata tag right before the new segment, thereby indicating the frame on which the new segment is to begin. The segment start metadata tag may be included in the segment metadata and may include timestamp information (e.g., decode timestamp and composition timestamp) and instantaneous decoder refresh (IDR) information, which allows the transcode servers to process and output a corresponding segment sequence number and presentation timestamp later on. This may allow multiple transcode servers to connect to the same video content stream and to produce aligned and synchronized segments and playlists. In some examples, the IDR information in the segment start metadata tag may include values such as true or false, and the IDR information may indicate whether, or not, the new segment begins with an IDR frame. New segments usually begin with IDR frames. However, in some cases, such as when consecutive IDR frames are spread far apart from one another, it may be necessary to start a segment on a frame that isn't an IDR frame. Also, in some examples, the timestamp information in the segment start metadata tag may indicate a decode timestamp and a composition timestamp, which may be used by the transcode server to calculate a presentation timestamp for the first frame of the new segment. This presentation timestamp may be provided to the video player to assist in playing of the video content.

In some examples, when a determination is made to remove a first transcode server from operation, one or more video content streams that are being produced by the first transcode server may be switched to one or more other transcode servers. For example, a first video stream that is being produced by the first transcode server may be switched to a second transcode server. Because both the first transcode server and the second transcode server may receive segment metadata from the segmentation component, the segmentation of the second transcode server will be aligned with the segmentation of the first transcode server once the second transcode server begins to produce segments for the video content stream. This may be true even though the first transcode server started producing the video content stream at the start of the transmission, and the second transcode server started producing the video content stream during the transmission (i.e., after the transmission had already started). Because the segmentation of the second transcode server is aligned with the segmentation of the first transcode server, the switch from the first transcode server to the second transcode server may be performed without interrupting playback.

Even when a first server is not being entirely removed from service, a determination sometimes may be made to switch a first video content stream from a first server to a second server for other reasons. This may occur, for example, when a determination is made to change a video transcode configuration (e.g. preset, bitrate etc.) of a first video content stream dynamically while transmitting. For example, in some cases, the first transcode server may not have sufficient available computing resources to support a new transcode configuration to which first video content stream is being changed. In this scenario, the first video content stream may be switched from the first transcode server to a second transcode server that has sufficient available computing resources to support the new transcode configuration. Similarly, in this scenario, because both the first transcode server and the second transcode server may receive segment metadata from the segmentation component, the segmentation of the second transcode server will be aligned with the segmentation of the first transcode server once the second transcode server begins to produce segments for the video content stream. Because the segmentation of the second transcode server is aligned with the segmentation of the first transcode server, the switch from the first transcode server to the second transcode server may be performed without interrupting playback.

The video streaming service may include a video delivery service that fetches and caches video segments and playlists. Video players may request the video segments and playlists, and the video delivery service may deliver the segments and playlists to the video players. In some examples, the video delivery service may maintain a mapping that indicates which transcode servers are producing which video streams. In some examples, after the initiation of the transmission of the first video content stream, an entry may be added to the mapping to indicate that the first transcode server is producing the first video content stream. This may allow the video delivery service to fetch playlists and segments for an initial portion of the first video content stream (i.e., a portion transmitted prior to the transcode server switch) from the first transcode server. Subsequently, when the production of the first video content stream is switched from the first transcode server to the second transcode server, the mapping may be modified to reflect that the second transcode server is producing the first video content stream. This may allow the video delivery service to fetch playlists and segments for a subsequent portion of the first video content stream (i.e., a portion transmitted after the transcode server switch) from the second transcode server.

Additionally, in some examples, multiple transcode servers may be employed in parallel to produce multiple video streams including different versions of the same video content, such as versions of the same content that are encoded using different codecs. For example, a first transcode server may encode the video content using a first codec (e.g., H.264), and a second transcode server may encode the same video content using a second codec (e.g., H.265). Similarly, in this scenario, because both the first transcode server and the second transcode server may receive segment metadata from the segmentation component, the segmentation of the second transcode server will be aligned with the segmentation of the first transcode server. The alignment of the first and second transcode servers may be advantageous, such as for scenarios in which a first video player switches codecs during transmission of the video content. Specifically, if the first video player switches from the first codec to the second codec, then the video delivery service may switch the first video player from the first transcode server's video content stream to the second transcode server's video content stream. Because the segmentation of the first transcode server is aligned with the segmentation of the second transcode server, this switch may be performed without interrupting playback at the first video player.

FIG. 1 is a diagram illustrating an example transcode server switching system that may be used in accordance with the present disclosure. As shown in FIG. 1, video content 101 may be transmitted from video source 151 to video streaming service 100. In some examples, the video content 101 may be encoded into a first video format when it is transmitted from video source 151 to video streaming service 100. The video streaming service 100 may transcode the video content 101, such as by decoding the video content and then re-encoding into a second video format that is different from the first video format. The video streaming service 100 may then, in turn, transmit the video content 101 to video player 150. The video content 101 may be transmitted, from video source 151 to video streaming service 100, and from video streaming service 100 to video player 150, over one or more local area networks (LAN's) and/or one or more wide area networks (WAN's), such as the Internet. In one specific example, video content 101 may be game video. For example, a video game player may sometimes capture video of himself or herself playing a video game, such as using video capture software. The game player may then transmit this game video from his or her computer, which may be the video source 151, to video streaming service 100. The video content 101 may be transmitted and played using streaming techniques, in which portions of the video content 101 are received and played while subsequent portions of the video content 101 are being transmitted. In some examples, the video content 101 may be live streaming content.

As shown in FIG. 1, the video content 101 may be received, at video streaming service 100, by an ingest service 110. The ingest service 110 may initiate video processing by calling a transcode state manager 124, for example via a call of an application programming interface (API) of the transcode state manager 124 (e.g., a create transcode API call). In response to this call, the transcode state manager 124 may create an entry, in data store 127, for the job of transcoding of the video content 101. This entry may include, for example, a transcode identifier (ID) for the job of transcoding video content 101, a stream ID for the video stream created by that job, a transcode server ID for the transcode server that performs the job, and other metadata. The transcode state manager 124 may also create job data 131, which is data associated with the job of the transcoding of the video content 101. The job data 131 may be enqueued in the queue 123.

The video streaming service 100 may operate a transcode server pool, which may include transcode server 121, transcode server 122 and optionally any number of other transcode servers (not shown in FIG. 1). The transcode servers in the transcode server pool may consume job data from the queue 123. In the example of FIG. 1, transcode server 121 retrieves job data 131 associated with the job of transcoding video content 101. The transcode server 121 may then start processing the video content 101. Specifically, the transcode server 121 may produce video segments and playlists for video content 101. The video player 150 requests the playlists and segments, and the video delivery service 125 calls the transcode server 121 to get the segments and playlists. The transcode server 121 may inform the transcode state manager 124 that it is performing the job of transcoding video content 101, and the transcode state manager may update the entry for the job in data store 127 with a transcode server ID for transcode server 121. In some examples, the transcode server 121 may inform the transcode state manager 124 that it is performing the job of transcoding video content 101 after the transcode server 121 has produced a full segment of the video content 101.

As shown in FIG. 1, the ingest service 110 includes a segmentation component 111 that divides the video content 101 into segments. The segmentation component 111 may generate segment metadata 113 that may be sent, along with the video content 101, to transcode server 121. The segment metadata 113 may include segment start metadata tags. In particular, based on a segmentation algorithm, whenever the segmentation component 111 decides to start a new segment, it may generate and send a segment start metadata tag right before the new segment, thereby indicating the frame on which the new segment is to begin. The segment start metadata tag may include timestamp information (e.g., decode timestamp and composition timestamp) and instantaneous decoder refresh (IDR) information, which allows the transcode server 121 to process and output a corresponding segment sequence number and presentation timestamp later on.

In the example of FIG. 1, at some time during the transmission of video content 101, a switch indication 161 is received at the transcode state manager 124. The switch indication 161 is an indication to perform a transcode server switch for video content 101, which is an indication to switch the job of transcoding video content 101 from transcode server 121 to a different transcode server. The switch indication 161 may be based on a determination by one or more users, by software, or by some combination of both. In some examples, the switch indication 161 may be based on a determination to temporarily, or permanently, remove transcode server 121 from operation. For example, in some cases, it may be desirable to remove transcode server 121 from operation, such as to upgrade firmware on the transcode server 121, to better consolidate jobs among a smaller quantity of transcode servers, or for other reasons.

As another example, switch indication 161 may be based on a determination to change to a video transcode configuration (e.g. preset, bitrate etc.) of video content 101 dynamically while transmitting. In one specific example, a user that provides the video content 101 may request to change a preset from fast to slow. In one scenario, the transcode server 121 may be incapable of supporting the slow preset, thereby requiring the use of a different transcode server that supports the slow preset. In another specific example, a user that provides the video content 101 may request to change a preset from slow to fast. In one scenario, a determination may be made to switch video content 101 from transcode server 121 (which may be capable of supporting both the slow and fast presets) to another transcode server (which may be capable of supporting the fast preset but not the slow present). This type of switch may be advantageous by freeing up transcode server 121 to take on other jobs requiring the slow preset.

As shown in FIG. 1, the switch indication 161 may be received by transcode state manager 124. For example, the switch indication 161 may be received via an API call to the transcode state manager 124. For examples in which the transcode server 121 is being removed from operation, the switch indication 161 may include the transcode server ID for transcode server 121 and may indicate that the transcode server 121 is being removed from operation. The transcode state manager 124 may then signal the transcode server 121 to stop consuming transcode jobs from the queue 123. The transcode state manager 124 may then identify, for example via a look-up in data store 127, the video streams that are currently being processed by the transcode server 121. The transcode state manager 124 may then clone the entries in the data store 127 for those jobs. The transcode state manager 124 may then generate new transcode job data for those jobs with indicators denoting that the job data is created for a switching request. For example, the transcode state manager may create switch job data 132, which is data associated with the job of the transcoding of the video content 101 with an indicator denoting that the data is created for a switching request. The switch job data 132 may be enqueued in the queue 123. It is noted that, for scenarios in which only the transcoding of video content 101 is being switched (but the entire transcode server 121 is not being removed from operation), the switch job data 132 may still be created and the corresponding entry in data store 127 may be cloned, but there may be no need to perform these tasks for other transcode jobs that are performed by transcode server 121.

In the example of FIG. 1, the switch job data 132 is retrieved, form queue 123, by transcode server 122. Upon retrieval of the switch job data 132, transcode server 122 may start processing the video content 101 by fetching it from the ingest service 110. The transcode server 122 may then start producing the segments and playlists for the video content 101. The transcode server 122 may then notify the transcode state manager 124 that it is ready to take over the video delivery for the video content 101. Because this is a switch job, the transcode server 122 may wait until it has produced at least a full playlist of segments to send this notification to the transcode state manager. This may help to ensure a seamless switch from the transcode server 121 to the transcode server 122, such as by ensuring that the video player 150 isn't switched to transcode server 122 before the transcode server 122 has produced at least a full playlist of segments. The transcode state manager 124 may update the cloned entry for video content 101 in data store 127 to indicate that transcode server 122 is performing the transcode job for video content 101. It is noted that, while FIG. 1 shows only a single queue 123, the video streaming service 100 may employ multiple queues, and the switch job data 132 may sometimes be sent to, and retrieved from, a different queue than the job data 131.

Similar to transcode server 121, transcode server 122 may also receive the segment metadata 113 from the segmentation component 111 along with the video content 101. As described above, the segment metadata 113 may include segment start metadata tags. In particular, based on a segmentation algorithm, whenever the segmentation component 111 decides to start a new segment, it may generate and send a segment start metadata tag right before the new segment, thereby indicating the frame on which the new segment is to begin. The segment start metadata tag may include timestamp information (e.g., decode timestamp and composition timestamp) and instantaneous decoder refresh (IDR) information, which allows the transcode server 122 to process and output a corresponding segment sequence number and presentation timestamp later on. The segment metadata 113, therefore, allows both transcode server 121 and transcode server 122 to connect to video content 101 and to produce aligned and synchronized segments and playlists. This allows seamless switching of the transcoding of video content 101 from transcode server 121 to transcode server 122 without interrupting playback of the video content 101. The segmentation component may be external to the transcode servers 121 and 122 and may communicate with the transcode servers 121 and 122, thereby allowing segmentation of the video content 101 to be aligned across the transcode servers 121 and 122.

As shown in FIG. 1, the video delivery service 125 includes mapping 126, which may indicate which transcode servers are producing which video streams. The mapping 126 may be built as a cache whose mapping entries are refreshed at regular intervals, such as intervals of a selected number of minutes. The video delivery service 125 may request the transcode state manager 124 to provide (e.g., based on data store 127) the transcode server ID for a transcode server associated with a given video stream. The video delivery service 125 may then cache an entry in mapping 126 to associate the transcode server ID with the given video stream. As a specific example, for the video stream associated with video content 101, when the video delivery service 125 makes a request to the transcode state manager 124 after transcode server 122 is ready to produce segments and playlists for video content 101, the transcode server may provide the transcode server ID for transcode server 122. The video delivery service 125 may then cache an entry in mapping 126 to associate the transcode server ID for transcode server 122 with the video stream for video content 101. Based on this entry in mapping 126, the video delivery service 125 may fetch subsequent playlists and segments from transcode server 122 instead of transcode server 121. The transcode state manager 124 may remove the initial transcode entry in data store 127 corresponding to the transcode server 121, for example after waiting a selected time period from when it served the new transcode server information (i.e., the indication of the transcode server 122) to the video delivery service 125. The removal of this initial transcode entry may signal the transcode server 121 to stop processing the video stream for video content 101.

In the example of FIG. 1, it is assumed that transcode servers 121 and 122 may employ the same codec (e.g., H.264, H.265, etc.) as one another. For simplicity of description, the codec is therefore not discussed in the above description of FIG. 1. It is noted, however, that many of the features described with reference to FIG. 1 (e.g., job data 131, switch job data 132, data store 127, mapping 126, etc.) may optionally include indications of the codec that is being used.

Figure 2:
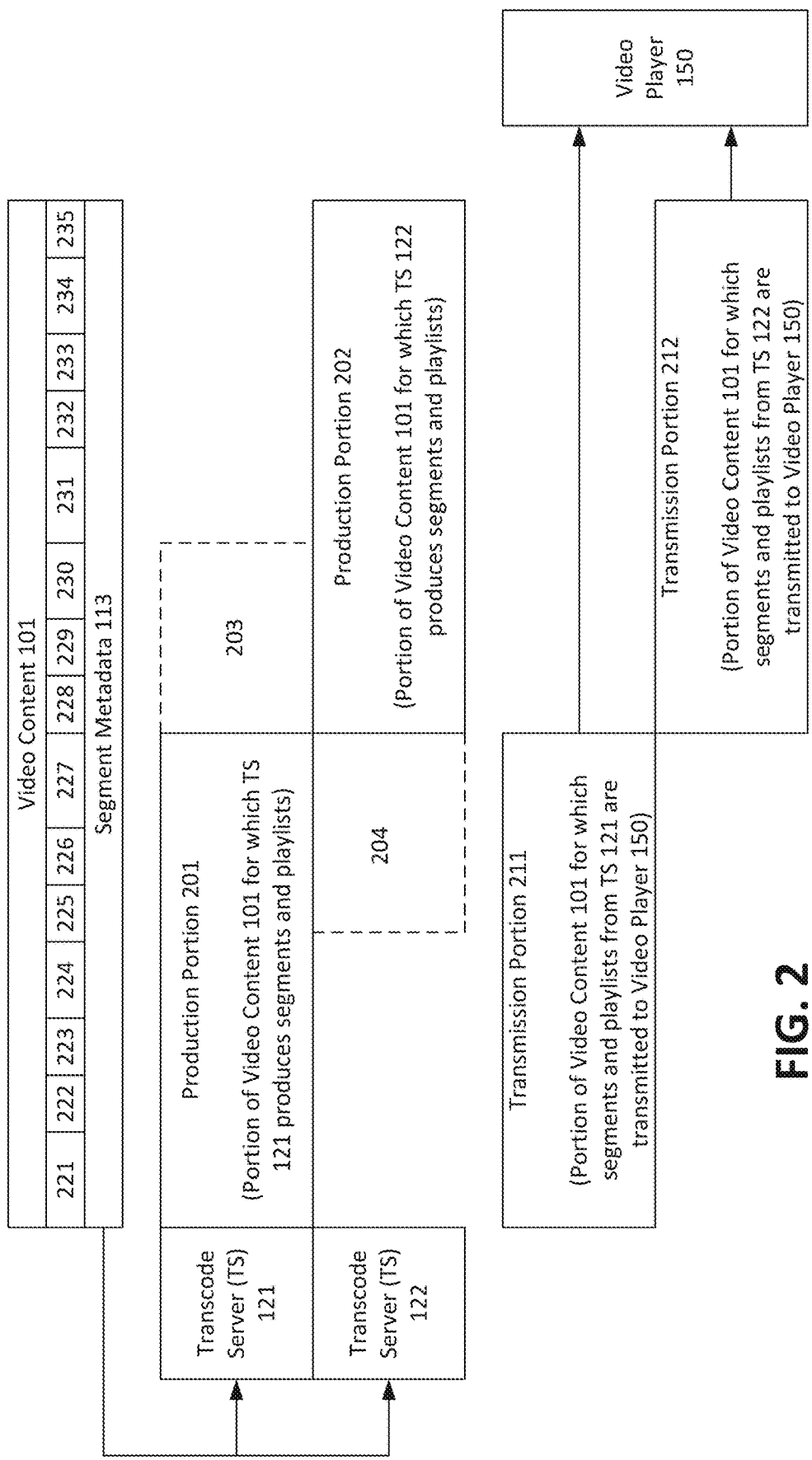
FIG. 2 is a diagram illustrating an example switch between transcode servers that may be used in accordance with the present disclosure.

Referring now to FIG. 2, an example of a switch between transcode servers will now be described in detail. As shown in FIG. 2, video content 101 may be divided into segments 221-235. For ease of description, in this example, the sequence numbers of segments 221-235 are identical to their reference numbers in FIG. 2, As described above, segmentation component 111, which may be included in ingest service 110, may divide the video content 101 into segments 221-235. For example, the segmentation component 111 may generate segment metadata 113 that may be sent, along with incoming video content 101, to any of one or more transcode servers that are transcoding the video content 101 (e.g., transcode servers 121 and 122). As described above, the segment metadata 113 may indicate a starting location, within video content 101, for each of segments 221-235.

As shown in FIG. 2, production portion 201 is a portion of video content 101 for which transcode server 121 produces segments and playlists. In this example, production portion 201 includes segments 221-227. As described above with reference to FIG. 1, transcode server 121 initially performs the job of transcoding video content 101. However, the job of transcoding video content 101 is eventually switched to transcode server 122, for example based on switch indication 161. As also shown in FIG. 2, production portion 202 is a portion of video content 101 for which transcode server 122 produces segments and playlists. In this example, production portion 202 includes segments 228-235.

In some examples, for a short period of time (i.e., corresponding to segments 225-227 and/or 228-230), both the transcode servers 121 and 122 may produce playlists and segments for video content 101. The reason for this overlap is that there may be a time delay between the time that transcode server 122 starts producing playlists and segments and the time that transcode server 121 stops producing playlists and segments. It is noted that the length of this time delay may optionally vary as desired (or may not exist at all). In the example of FIG. 2, optional additional production portion 203 is shown to indicate that transcode server 121 may sometimes continue to produce video segments and playlists for a short time period after switching transmission to transcode server 122. Additionally, optional additional production portion 204 is shown to indicate that transcode server 122 may sometimes start to produce video segments and playlists for a short time period prior to switching transmission to transcode server 122.

As also shown in FIG. 2, transmission portion 211 is a portion of video content 101 for which segments and playlists from transcode server 121 are transmitted to video player 150. In this example, transmission portion 211 includes segments 221-227. Additionally, transmission portion 212 is a portion of video content 101 for which segments and playlists from transcode server 122 are transmitted to video player 150. In this example, transmission portion 212 includes segments 228-235. As described above, the segment metadata 113 allows the segmentation of transcode server 121 and the segmentation of transcode server 122 to be aligned and synchronized with one another. For example, as shown in FIG. 2, the last segment included in transmission portion 211 is segment 227. Additionally, the first segment included in transmission portion 211 is segment 228. The use of segment metadata 113 ensures that segment 228 of transmission portion 211, which is produced by transcode server 122, will begin right after the end of segment 227 of transmission portion 212, which is produced by transcode server 121. This ensures that segments 221-235 of video content 101 are transmitted in proper sequence, and in their entirety, without interrupting playback, even though a switch is made from transcode server 121 to transcode server 122.

Figure 3:
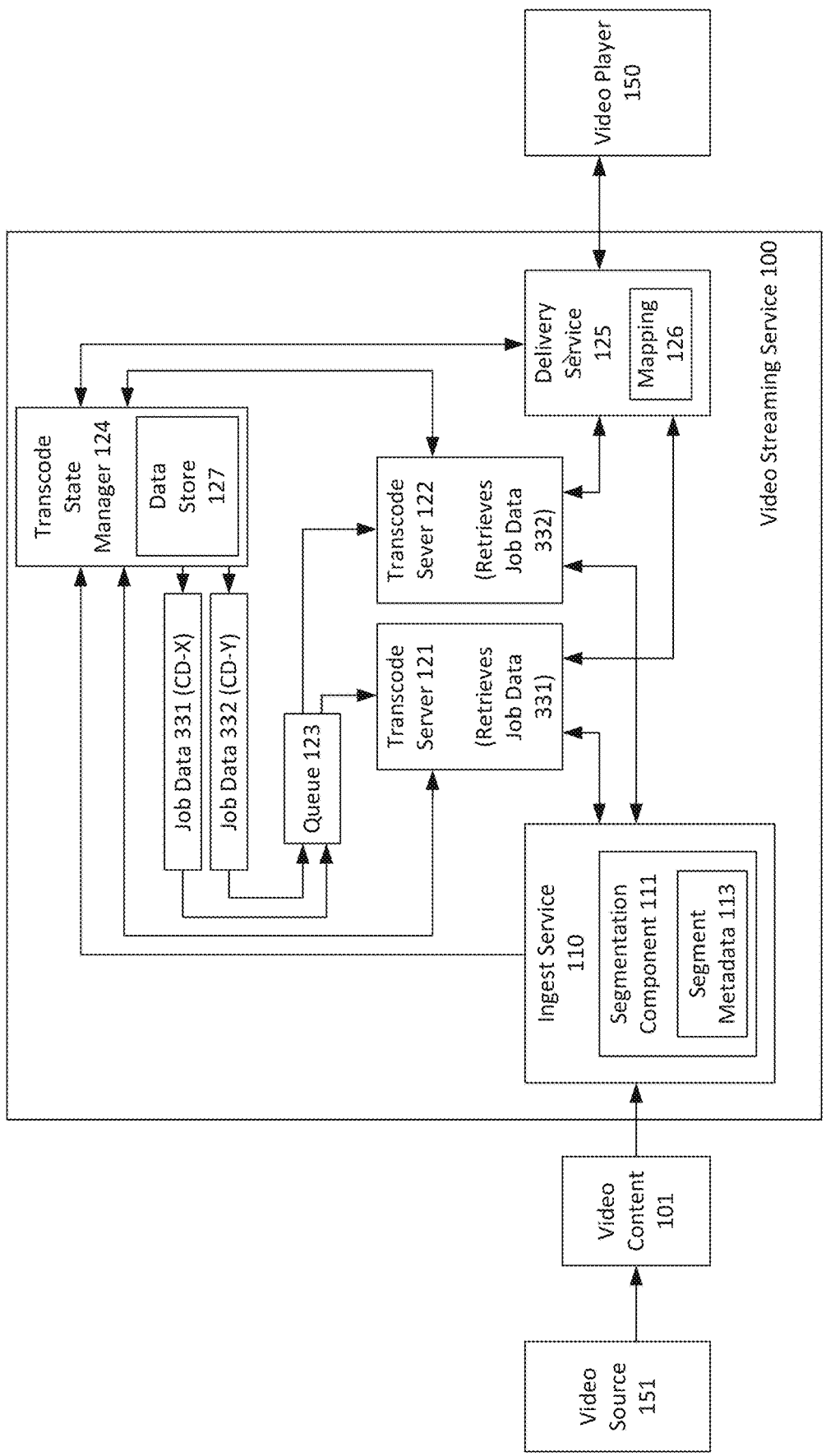
FIG. 3 is a diagram illustrating an example codec switching system that may be used in accordance with the present disclosure.

Referring now to FIG. 3, an example is described in which multiple transcode servers (i.e., transcode servers 321 and 322) may be employed in parallel to produce multiple video streams including different versions of video content 101, such as versions that are encoded using different codecs. Specifically, in this example, transcode server 321 may encode the video content 101 using a first codec (CD) referred to for simplicity as CD-X (e.g., H.264). Additionally, transcode server 322 may encode the video content 101 using a second codec (CD) referred to for simplicity as CD-Y (e.g., H.265). Similarly, in this scenario, because both the transcode server 321 and the transcode server 322 may receive segment metadata 113 from the segmentation component 111, the segmentation of the transcode server 322 will be aligned with the segmentation of the transcode server 321. The alignment of the transcode servers 321 and 322 may be advantageous because, in this example, video player 150 switches codecs during transmission of the video content 101. Specifically, in this example, video player 150 begins receiving video content 101 using codec CD-X. Accordingly, segments from transcode server 321, which are encoded using CD-X, are initially delivered to video player 150. However, at some point during transmission, video player 150 requests to switch from codec CD-X to codec CD-Y. In response to this, the video delivery service 125 may switch the video player 150 from transcode server 321 to transcode server 322. After this switch, segments from transcode server 322, which are encoded using CD-Y, are delivered to video player 150. Because the segmentation of the transcode server 321 is aligned with the segmentation of the transcode server 322, this switch may be performed without interrupting playback at the video player 150.

In the example of FIG. 3, the transcode state manager 124 may create an entry, in data store 127, for the job of transcoding of the video content 101 using CD-X. This entry may include, for example, a transcode identifier (ID) for the job of transcoding video content 101 using CD-X, a stream ID for the video stream created by that job, a transcode server ID for the transcode server that performs the job, and other metadata. The transcode state manager 124 may also create job data 331, which is data associated with the job of the transcoding of the video content 101 using CD-X. The job data 331 may be enqueued in the queue 123.

Additionally, the transcode state manager 124 may create an entry, in data store 127, for the job of transcoding of the video content 101 using CD-Y. This entry may include, for example, a transcode identifier (ID) for the job of transcoding video content 101 using CD-Y, a stream ID for the video stream created by that job, a transcode server ID for the transcode server that performs the job, and other metadata. The transcode state manager 124 may also create job data 332, which is data associated with the job of the transcoding of the video content 101 using CD-Y. The job data 332 may be enqueued in the queue 123. It is noted that, while FIG. 3 shows only a single queue 123, the video streaming service 100 may employ multiple queues, and the job data 332 may sometimes be sent to, and retrieved from, a different queue than the job data 331.

The video streaming service 100 may operate a transcode server pool, which may include transcode server 321, transcode server 322 and optionally any number of other transcode servers (not shown in FIG. 3). The transcode servers in the transcode server pool may consume job data from the queue 123. In the example of FIG. 3, transcode server 321 retrieves job data 331 associated with the job of transcoding video content 101 using CD-X. The transcode server 321 may inform the transcode state manager 124 that it is performing the job of transcoding video content 101 using CD-X, and the transcode state manager 124 may update the entry for the job in data store 127 with a transcode server ID for transcode server 321. The transcode server 321 may then start processing the video content 101 using CD-X. Specifically, the transcode server 321 may produce video segments for video content 101 using CD-X and corresponding playlists.

Additionally, in the example of FIG. 3, transcode server 322 retrieves job data 332 associated with the job of transcoding video content 101 using CD-Y. The transcode server 322 may inform the transcode state manager 124 that it is performing the job of transcoding video content 101 using CD-Y, and the transcode state manager 124 may update the entry for the job in data store 127 with a transcode server ID for transcode server 322. The transcode server 322 may then start processing the video content 101 using CD-Y. Specifically, the transcode server 322 may produce video segments for video content 101 using CD-Y and corresponding playlists.

As described above, the video delivery service 125 includes mapping 126, which may indicate which transcode servers are producing which video streams. The mapping 126 may be built as a cache whose mapping entries are refreshed at regular intervals, such as intervals of a selected number of minutes. The video delivery service 125 may request the transcode state manager 124 to provide (e.g., based on data store 127) the transcode server ID for a transcode server associated with a given video stream. Thus, in the example of FIG. 3, mapping 126 may include an entry indicating that transcode server 321 is providing video content 101 using codec CD-X. Additionally, mapping 126 may include another entry indicating that transcode server 322 is providing video content 101 using codec CD-Y.

As described above, in the example of FIG. 3, the video player 150 may initially employ codec CD-X. Thus, at the start of transmission, the video player 150 may request playlists and segments, and the video delivery service 125 may call the transcode server 321 to get the segments encoded using CD-X and corresponding playlists. However, at some point during transmission, video player 150 requests to switch from codec CD-X to codec CD-Y. In response to this, the video delivery service 125 may switch the video player 150 from transcode server 321 to transcode server 322. Specifically, the video delivery service 125 may use the information in mapping 126 to determine that transcode server 322 is producing video content 101 using CD-Y. Based on this information from mapping 126, the video delivery service may subsequently fetch segments from transcode server 322, which are encoded using CD-Y, and corresponding playlists. These segments and playlists from transcode server 322 may then be delivered to video player 150. Because the segmentation of the transcode server 321 is aligned with the segmentation of the transcode server 322, this switch may be performed without interrupting playback at the video player 150.

Figure 4:
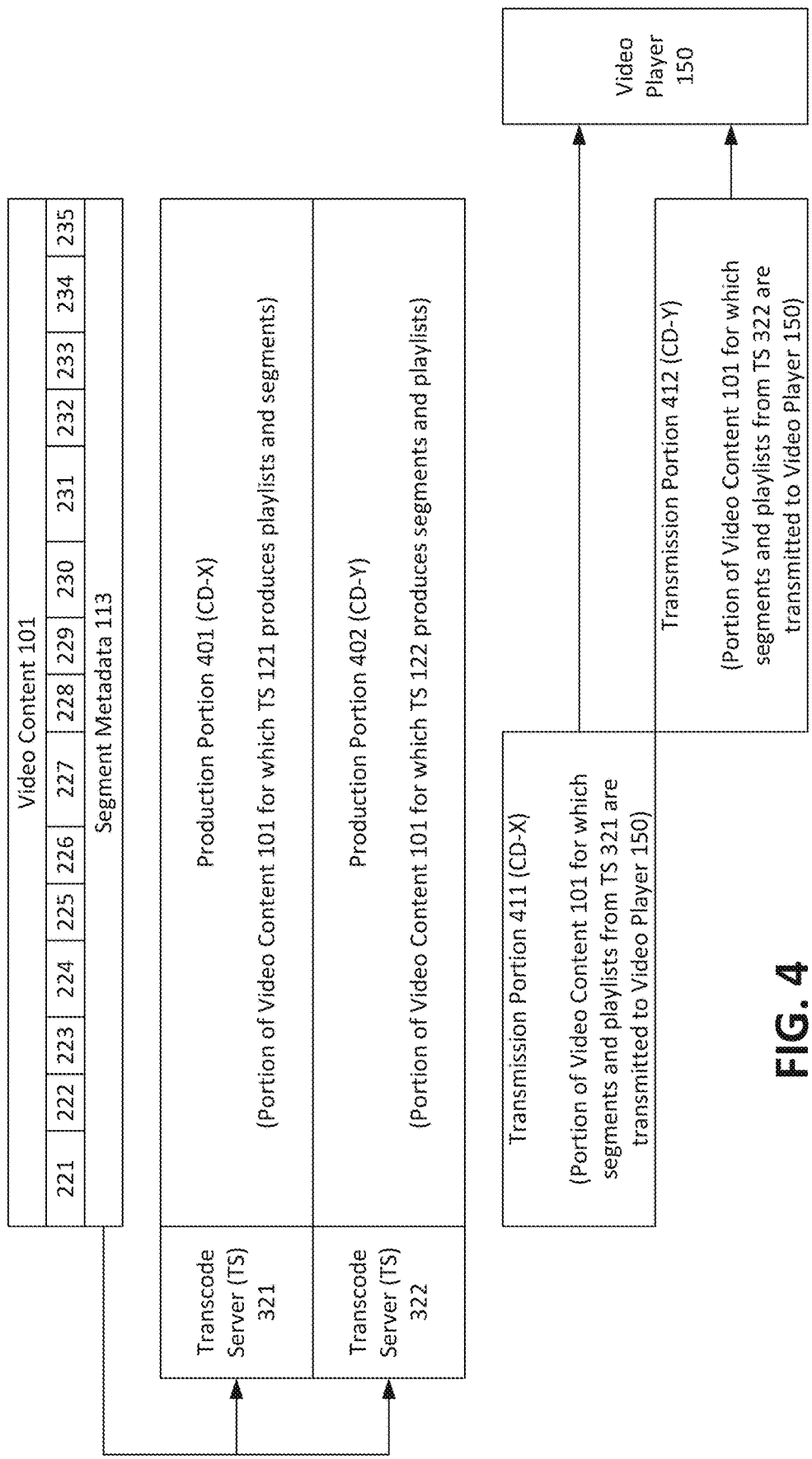
FIG. 4 is a diagram illustrating an example switch between codecs that may be used in accordance with the present disclosure.

Referring now to FIG. 4, an example switch between codecs will now be described in detail. As shown in FIG. 4, video content 101 may be divided into segments 221-235. For ease of description, in this example, the sequence numbers of segments 221-235 are identical to their reference numbers in FIG. 4. As described above, segmentation component 111, which may be included in ingest service 110, may divide the video content 101 into segments 221-235. For example, the segmentation component 111 may generate segment metadata 113 that may be sent, along with incoming video content 101, to any of one or more transcode servers that are transcoding the video content 101 (e.g., transcode servers 321 and 322). As described above, the segment metadata 113 may indicate a starting location, within video content 101, for each of segments 221-235.

As shown in FIG. 4, production portion 401 is a portion of video content 101 for which transcode server 321 produces segments (encoded using codec CD-X) and playlists. In this example, production portion 201 includes all (i.e., a complete portion) of video content 101, which includes segments 221-235. As also shown in FIG. 2, production portion 402 is a portion of video content 101 for which transcode server 322 produces segments (encoded using codec CD-Y) and playlists. In this example, production portion 402 includes all (i.e., a complete portion) of video content 101, which includes segments 221-235. Thus, in this example, transcode server 321 and transcode server 322 operate in parallel to produce segments 221-235 (albeit using different codecs).

As also shown in FIG. 4, transmission portion 411 is a portion of video content 101 for which segments (encoded using codec CD-X) and playlists from transcode server 321 are transmitted to video player 150. In this example, transmission portion 411 includes segments 221-227. Additionally, transmission portion 412 is a portion of video content 101 for which segments (encoded using codec CD-Y) and playlists from transcode server 322 are transmitted to video player 150. In this example, transmission portion 212 includes segments 228-235. In this example, after segment 227, the video player 150 requests to switch from CD-X to CD-Y. For this reason, transmission portion 411 ends at segment 227, and transmission portion 412 begins at segment 228. As described above, the segment metadata 113 allows the segmentation of transcode server 321 and the segmentation of transcode server 322 to be aligned and synchronized with one another. For example, as shown in FIG. 4, the last segment included in transmission portion 411 is segment 227. Additionally, the first segment included in transmission portion 411 is segment 228. The use of segment metadata 113 ensures that segment 228 of transmission portion 411, which is produced by transcode server 322, will begin right after the end of segment 227 of transmission portion 412, which is produced by transcode server 321. This ensures that segments 221-235 of video content 101 are transmitted in proper sequence, and in their entirety, without interrupting playback, even though a switch is made from transcode server 321 to transcode server 322 (and from codec CD-X to codec CD-Y).

Figure 5:
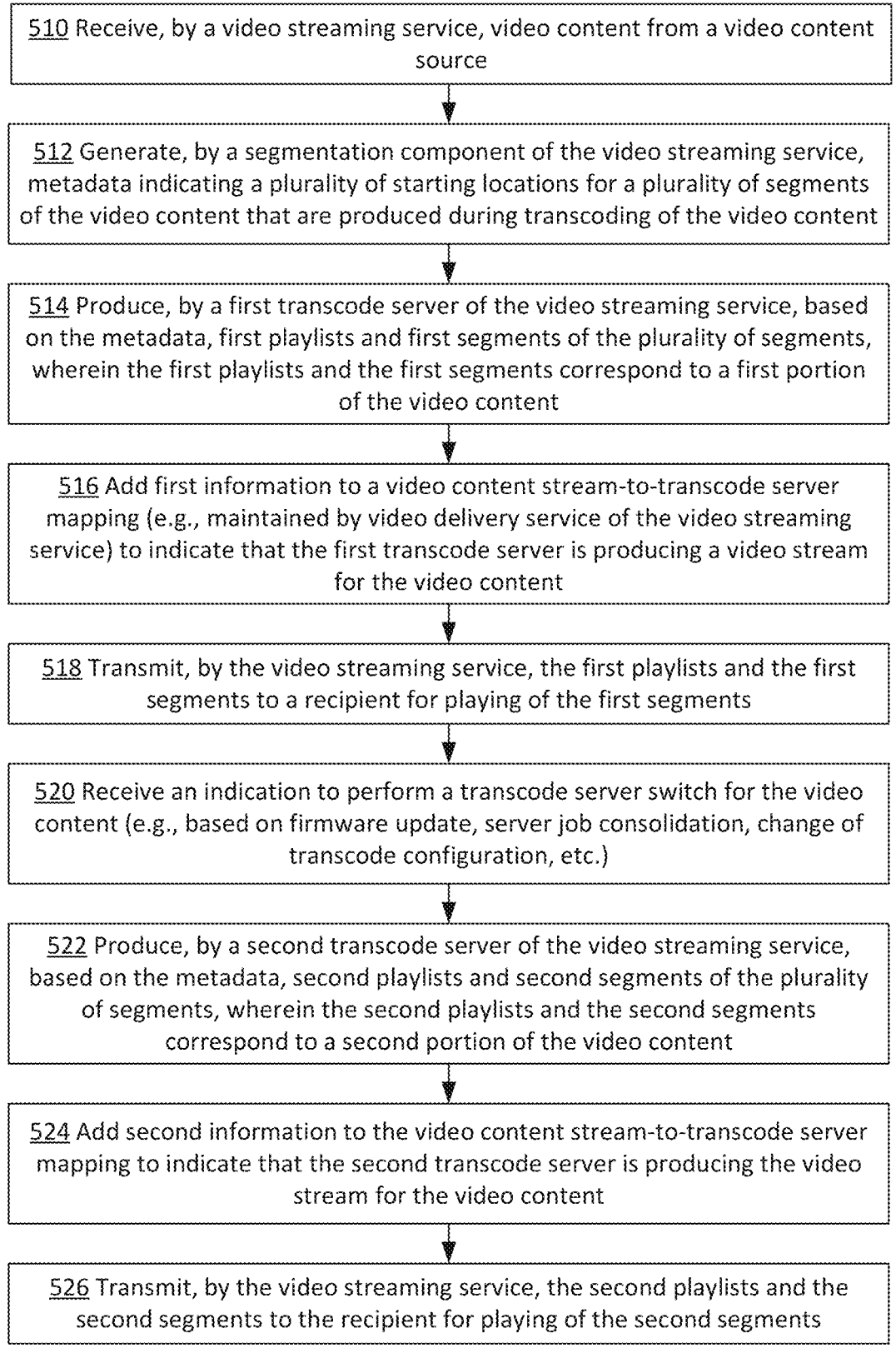
FIG. 5 is a flowchart illustrating an example an example transcode server switching process that may be used in accordance with the present disclosure.

FIG. 5 is a flowchart illustrating an example transcode server switching process that may be used in accordance with the present disclosure. The process of FIG. 5 is initiated at operation 510, at which video content is received, by a video streaming service, from a video content source. For example, as shown in FIG. 1, video content 101 is received by ingest service 110 of video streaming service 100. The video content may be transmitted and played using streaming techniques, in which portions of transmitted content are received and played while subsequent portions of the transmitted content are being transmitted. In some examples, the video content may be live streaming video content that is transmitted and played using live streaming techniques. The term live streaming, as used herein, refers to scenarios in which video content of an event (e.g., a video game) may be transmitted to viewers, and at least part of the video content may be played while the event is still occurring (e.g., while the video game is still being played by the players), albeit with some small amounts latency between the time that video content is captured and the time that the video is eventually played to viewers.

At operation 512, metadata indicating a plurality of starting locations for a plurality of segments of the video content that are produced during transcoding of the video content is generated by a segmentation component of the video streaming service. As described above, the segmentation component may be external to the transcode servers of the video streaming service. For example, the segmentation component may be operated by the ingest service of the video streaming service. The segmentation component may communicate with multiple different transcode servers, thereby allowing segmentation of the video content to be aligned across multiple transcode servers. In some examples, the segmentation component may generate segment metadata that may be sent, along with the incoming video content stream, to any of one or more transcode servers that are transcoding the video content. The segment metadata may include segment start metadata tags that are used to indicate the start of each segment of the video content. In particular, based on a segmentation algorithm, whenever the segmentation component decides to start a new segment, it may generate and send a segment start metadata tag right before the new segment, thereby indicating the frame on which the new segment is to begin. The segment start metadata tag may be included in the segment metadata and may include timestamp information (e.g., decode timestamp and composition timestamp) and instantaneous decoder refresh (IDR) information, which allows the transcode servers to process and output a corresponding segment sequence number and presentation timestamp later on. This may allow multiple transcode servers to connect to the same video content stream and to produce aligned and synchronized segments and playlists.

At operation 514, first playlists and first segments of the plurality of segments are produced, based on the metadata from the segmentation component, by a first transcode server of the video streaming service, wherein the first playlists and the first segments correspond to a first portion of the video content. The first playlists may allow requesting of the first segments. For example, as shown in FIG. 2, transcode server 121 may produce playlists and segments for video content 101 that correspond to production portion 201. Thus, in the of example of FIG. 2, the first portion of the video content is the production portion 201, and the first video segments are segments 221-227. As described above, the segment start metadata tags, which may be included in the segment metadata, may include timestamp information (e.g., decode timestamp and composition timestamp) and instantaneous decoder refresh (IDR) information, which allows the transcode server 121 to process and output a corresponding segment sequence number and presentation timestamp later on. As described above, the transcode state manager 124 may enqueue job data for transcoding of the video content (e.g., job data 131), and this job data may be retrieved from the queue 123 by the transcode server 121. It is noted that, in some examples, the first transcode server may optionally produce some additional segments and additional playlists (i.e., in addition to the first segments and the first playlists). For example, as shown in FIG. 2, transcode server 121 may optionally produce segments and playlists corresponding to optional additional production portion 203 (e.g., including segments 228-230).

At operation 516, first information indicating that the first transcode server is producing a video stream for the video content is added to a video content stream-to-transcode server mapping. This first information may be added to the video content stream-to-transcode server mapping after the first transcode server begins producing the first segments. As described above, a video content stream-to-transcode server mapping (e.g., mapping 126) may be maintained by a video delivery service 125. For example, the video delivery service 125 may periodically (e.g., at intervals of a selected quantity of minutes) request, from the transcode state manager 124, data indicating which transcode servers are producing which video streams, such as may be stored in data store 127. This data may then be received and stored, by the video delivery service 125, in mapping 126, which may be used as a cache mapping. In some examples, once the transcode server 121 begins producing segments for video content 101, an indication of this will be stored in the data store 127 and then, in turn, in mapping 126.

At operation 518, the first playlists and the first segments are transmitted, by the video streaming service, to a recipient (e.g., video player 150) for playing of the first segments. For example, as shown in FIG. 2, for transmission portion 211 (e.g., including segments 221-227 from production portion 201), segments and playlists from transcode server 121 are transmitted to video player 150. As described above, the video delivery service 125 may fetch the first playlists and the first segments from the transcode server 121, and the first playlists and the first segments may then be transmitted to video player 150. The first playlists may be used by the video player 150 to request the first segments. In some examples, the first playlists and the first segments may be transmitted to the recipient based at least in part on the first information in the video content stream-to-transcode server mapping. For example, prior to fetching the first playlists and the first segments, the video delivery service may consult the mapping 126 to identify that the first transcode server is mapped to the video stream for the video content 101.

At operation 520, an indication to perform a transcode server switch for the video content is received. As described above, at some time during the transmission of video content 101, a switch indication 161 may be received at the transcode state manager 124. The switch indication 161 is an indication to perform a transcode server switch for video content 101, which is an indication to switch the job of transcoding video content 101 from transcode server 121 to a different transcode server. In some examples, the switch indication 161 may be based at least in part on a determination to temporarily, or permanently, remove transcode server 121 from operation. For example, in some cases, it may be desirable to remove transcode server 121 from operation, such as to upgrade firmware on the transcode server 121, to better consolidate jobs among a smaller quantity of transcode servers, or for other reasons. As another example, switch indication 161 may be based at least in part on a determination to change to a video transcode configuration (e.g. preset, bitrate etc.) of video content 101 dynamically while transmitting.

At operation 522, second playlists and second segments of the plurality of segments are produced, based on the metadata from the segmentation component, by a second transcode server of the video streaming service, wherein the second playlists and the second segments correspond to a second portion of the video content. The second portion of the video content may be subsequent to the first portion of the video content. The second playlists may allow requesting of the second segments. For example, as shown in FIG. 2, transcode server 122 may produce playlists and segments for video content 101 that correspond to production portion 202. Thus, in the example of FIG. 2, the second portion of the video content is the production portion 202, and the second video segments are segments 228-235. As described above, the segment start metadata tag, which may be included in the segment metadata, may include timestamp information (e.g., decode timestamp and composition timestamp) and instantaneous decoder refresh (IDR) information, which allows the transcode server 122 to process and output a corresponding segment sequence number and presentation timestamp later on. As described above, based on receiving the switch indication 161, the transcode state manager 124 may enqueue switch job data for switching transcoding of the video content (e.g., switch job data 132), and this switch job data may be retrieved from the queue 123 by the transcode server 122. Thus, operation 522 may be performed based, at least in part, on the indication received at operation 520. It is noted that, in some examples, the second transcode server may optionally produce some additional segments and additional playlists (i.e., in addition to the second segments and the second playlists). For example, as shown in FIG. 2, transcode server 122 may optionally produce segments and playlists corresponding to optional additional production portion 204 (e.g., including segments 225-227).

At operation 524, second information indicating that the second transcode server is producing a video stream for the video content is added to a video content stream-to-transcode server mapping. This second information may be added to the video content stream-to-transcode server mapping after the second transcode server begins producing the second segments, such as after the second transcode server had produced at least a full playlist of segments. As described above, a video content stream-to-transcode server mapping (e.g., mapping 126) may be maintained by a video delivery service 125, which fetches the first segments from the first transcode server and the second segments from the second transcode server. For example, the video delivery service 125 may periodically (e.g., at intervals of a selected quantity of minutes) request, from the transcode state manager 124, data indicating which transcode servers are producing which video streams, such as may be stored in data store 127. This data may then be received and stored, by the video delivery service 125, in mapping 126, which may be used as a cache mapping. In some examples, after the transcode server 122 begins producing segments for video content 101 (e.g., after producing at least a full playlist of segments), an indication of this will be stored in the data store 127 and then, in turn, in mapping 126.

At operation 526, the second playlists and the second segments are transmitted, by the video streaming service, to the recipient (e.g., video player 150) for playing of the second segments. For example, as shown in FIG. 2, for transmission portion 211 (e.g., including segments 221-227 from production portion 202), segments and playlists from transcode server 121 are transmitted to video player 150. As described above, the video delivery service 125 may fetch the second playlists and the second segments from the transcode server 122, and the second playlists and the second segments may then be transmitted to video player 150. The second playlists may be used by the video player 150 to request the second segments. In some examples, the second playlists and the second segments may be transmitted to the recipient based at least in part on the second information in the video content stream-to-transcode server mapping. For example, prior to fetching the second playlists and the second segments, the video delivery service may consult the mapping 126 to determine that production of the video stream for the video content 101 is switched to transcode server 122.

It is noted that, in some examples, the first transcode server may not operate on at least part of the second portion of the video content. This means that the first transcode server may not produce any playlists or segments that correspond to at least part of the second portion of the video content. For example, as shown in FIG. 2, for scenarios in which transcode server 121 produces only production portion 201, the transcode server 121 will not produce any of the second portion of the video content (i.e., transcode server 121 will not produce segments 228-235). Moreover, even for scenarios in which the transcode server 121 produces both production portion 201 and optional additional production portion 203, the transcode server 121 still will not produce part of the second portion of the video content (i.e., transcode server 121 will not produce segments 231-235). Additionally, in some examples, the second transcode server may not operate on at least part of the first portion of the video content. This means that the second transcode server may not produce any playlists or segments that correspond to at least part of the first portion of the video content. For example, as shown in FIG. 2, for scenarios in which transcode server 122 produces only production portion 202, the transcode server 122 will not produce any of the first portion of the video content (i.e., transcode server 122 will not produce segments 221-227). Moreover, even for scenarios in which the transcode server 122 produces both production portion 202 and optional additional production portion 204, the transcode server 122 still will not produce part of the first portion of the video content (i.e., transcode server 122 will not produce segments 221-224).

Figure 6:
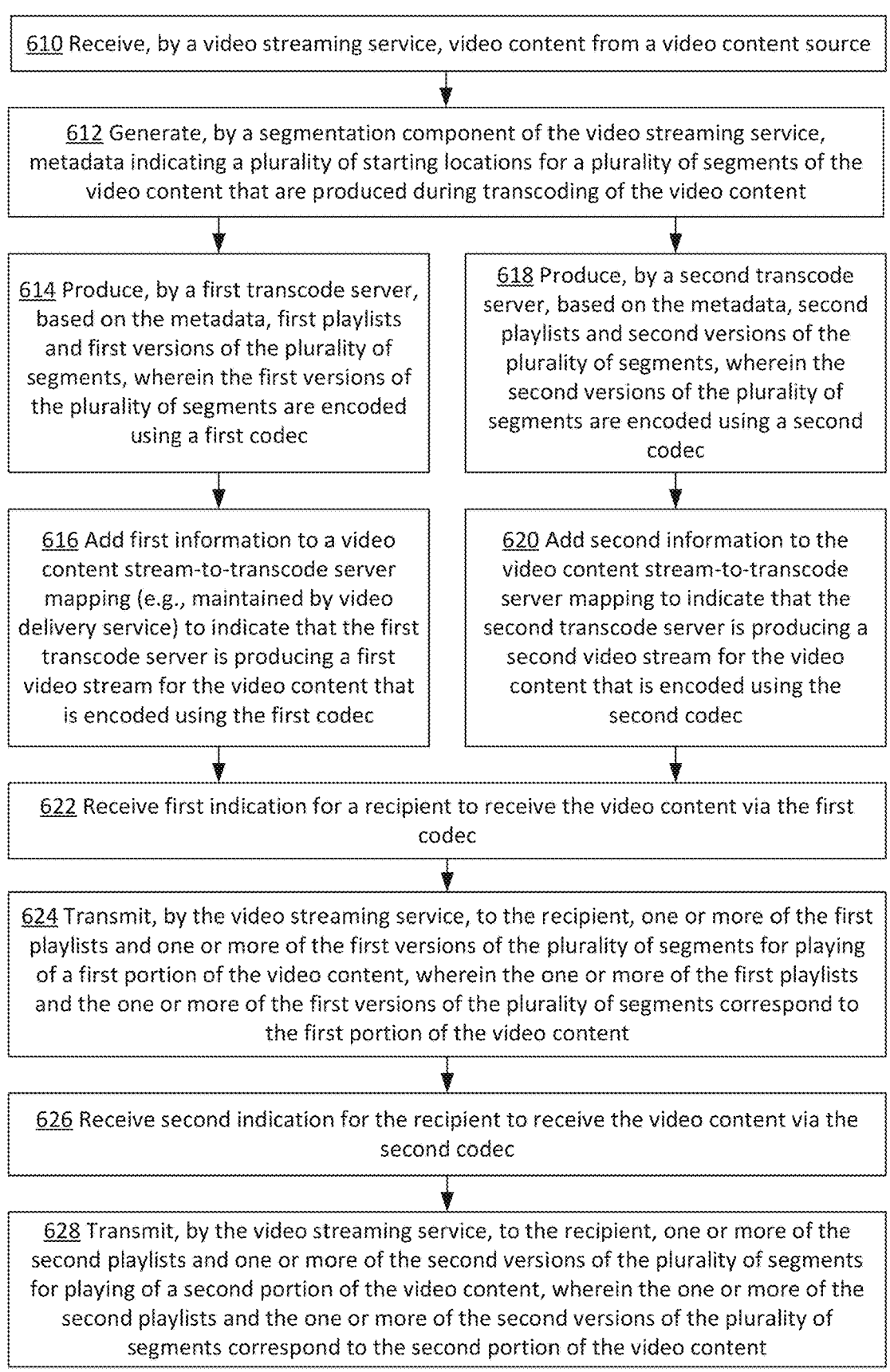
FIG. 6 is a flowchart illustrating an example codec switching process that may be used in accordance with the present disclosure.

FIG. 6 is a flowchart illustrating an example codec switching process that may be used in accordance with the present disclosure. The process of FIG. 6 is initiated at operation 610, at which video content is received, by a video streaming service, from a video content source. For example, as shown in FIG. 3, video content 101 is received by ingest service 110 of video streaming service 100. The video content may be transmitted and played using streaming techniques, in which portions of transmitted content are received and played while subsequent portions of the transmitted content are being transmitted. In some examples, the video content may be live streaming video content that is transmitted and played using live streaming techniques.

At operation 612, metadata indicating a plurality of starting locations for a plurality of segments of the video content that are produced during transcoding of the video content is generated by a segmentation component of the video streaming service. As described above, the segmentation component may be external to the transcode servers of the video streaming service. For example, the segmentation component may be operated by the ingest service of the video streaming service. It is noted that operation 612 of FIG. 6 may be identical to operation 512 of FIG. 5, and the description of operation 512 may apply to operation 612 without being repeated here.

At operation 614, first playlists and first versions of the plurality of segments are produced, by a first transcode server, based on the metadata from the segmentation component, wherein the first versions of the plurality of segments are encoded using a first codec. The first playlists may allow requesting of the first versions of the plurality of segments. For example, as shown in FIG. 4, transcode server 321 may produce playlists and segments (via codec CD-X) for video content 101 that correspond to production portion 401. As described above, segment start metadata tags, which may be included in the segment metadata, may include timestamp information (e.g., decode timestamp and composition timestamp) and instantaneous decoder refresh (IDR) information, which allows the transcode server 321 to process and output a corresponding segment sequence number and presentation timestamp later on. As also described above, the transcode state manager 124 may enqueue job data for transcoding of the video content using CD-X (e.g., job data 331), and this job data may be retrieved from the queue 123 by the transcode server 321.

At operation 616, first information indicating that the first transcode server is producing a first video stream for the video content that is encoded using the first codec is added to a video content stream-to-transcode server mapping. This first information may be added to the video content stream-to-transcode server mapping after the first transcode server begins producing segments of video content using the first codec. As described above, a video content stream-to-transcode server mapping (e.g., mapping 126) may be maintained by a video delivery service 125. For example, the video delivery service 125 may periodically (e.g., at intervals of a selected quantity of minutes) request, from the transcode state manager 124, data indicating which transcode servers are producing which video streams, such as may be stored in data store 127. This data may then be received and stored, by the video delivery service 125, in mapping 126, which may be used as a cache mapping. In some examples, once the transcode server 321 begins producing the segments of the video content using codec CD-X, an indication of this will be stored in the data store 127 and then, in turn, in mapping 126.

At operation 618, second playlists and second versions of the plurality of segments are produced, by a second transcode server, based on the metadata from the segmentation component, wherein the second versions of the plurality of segments are encoded using a second codec. The second playlists may allow requesting of the second versions of the plurality of segments. For example, as shown in FIG. 4, transcode server 322 may produce playlists and segments (via codec CD-Y) for video content 101 that correspond to production portion 402. As described above, segment start metadata tags, which may be included in the segment metadata, may include timestamp information (e.g., decode timestamp and composition timestamp) and instantaneous decoder refresh (IDR) information, which allows the transcode server 322 to process and output a corresponding segment sequence number and presentation timestamp later on. As described above, the transcode state manager 124 may enqueue job data for transcoding of the video content using CD-Y (e.g., job data 332), and this job data may be retrieved from the queue 123 by the transcode server 322. In some examples, operations 614 and 618 may be performed in parallel. For example, the first transcode server and the second transcode server may operate in parallel to produce the first versions of the plurality of segments and the second versions of the plurality of segments. Additionally, as described above, a segmentation of the first versions of the plurality of segments may be aligned with a segmentation of the second versions of the plurality of segments At operation 620, second information indicating that the second transcode server is producing a second video stream for the video content that is encoded using the second codec is added to a video content stream-to-transcode server mapping. This second information may be added to the video content stream-to-transcode server mapping after the second transcode server begins producing segments of the video content using the second codec. As described above, a video content stream-to-transcode server mapping (e.g., mapping 126) may be maintained by a video delivery service 125, which fetches the first versions of the plurality of segments from the first transcode server and the second versions of the plurality of segments from the second transcode server. For example, the video delivery service 125 may periodically (e.g., at intervals of a selected quantity of minutes) request, from the transcode state manager 124, data indicating which transcode servers are producing which video streams, such as may be stored in data store 127. This data may then be received and stored, by the video delivery service 125, in mapping 126, which may be used as a cache mapping. In some examples, once the transcode server 322 begins producing the segments of the video content using codec CD-Y, an indication of this will be stored in the data store 127 and then, in turn, in mapping 126.

At operation 622, a first indication is received for a recipient (e.g., video player 150) to receive the video content via the first codec. For example, in some cases, at the start of the transmission, the video streaming service 100 may send a master manifest to the video player 150. The master manifest may indicate, to the video player 150, different renditions of the video content 101 that are available, such as renditions using different codecs, having different bitrates, different resolutions and/or other different characteristics. Thus, the different renditions of the video content 101 indicated in the master manifest are different available versions of the video content 101. The video player 150 may then select one of the renditions/versions indicated in the master manifest and request a playlist for the selected rendition/version. During the transmission, the video player 150 may optionally switch between different renditions/versions. For example, as described above, the video player may switch between different renditions/versions corresponding to different codecs. In some examples, at the start of the transmission (e.g., just before transmission of segment 221), the video player 150 may, based on the information in the master manifest, select a first rendition corresponding to the first codec. The video player 150 may then request a playlist for the first rendition corresponding to the first codec. The request for this playlist may be the first indication that is received at operation 622.

At operation 624, one or more of the first playlists and one or more of the first versions of the plurality of segments are transmitted, by the video streaming service, to the recipient, for playing of a first portion of the video content, wherein the one or more of the first playlists and the one or more of the first versions of the plurality of segments correspond to the first portion of the video content. For example, as shown in FIG. 4, for transmission portion 411 (e.g., including segments 221-227), playlists and segments from transcode server 321 (e.g., including versions of segments 221-227 that are encoded using codec CD-X) are transmitted to video player 150. Thus, in the example of FIG. 4, the first portion of the video content is transmission portion 411, which includes segments 221-227. Operation 624 may be performed based, at least in part, on the indication received at operation 622.

As described above, the video delivery service 125 may fetch the one or more of the first playlists and the one or more of the first versions of the plurality of segments from the transcode server 321, and the one or more of the first playlists and the one or more of the first versions of the plurality of segments may then be transmitted to video player 150. In some examples, the one or more of the first playlists and the one or more of the first versions of the plurality of segments may be transmitted to the recipient based at least in part on the first information in the video content stream-to-transcode server mapping. For example, prior to fetching the one or more of the first playlists and the one or more of the first versions of the plurality of segments from transcode server 321, the video delivery service 125 may consult the mapping 126 to identify that transcode server 321 is producing a the video stream for the video content 101 encoded using the first codec (e.g., CD-X).

At operation 626, a second indication is received for the recipient (e.g., video player 150) to receive the video content via the second codec. For example, in some cases, at some point during transmission of the video content 101 (e.g., just before transmission of segment 228), the video player 150 may, based on the information in the master manifest, select a second rendition corresponding to the second codec. The video player 150 may then request a playlist for the second rendition corresponding to the second codec. The request for this playlist may be the second indication that is received at operation 626.

At operation 628, one or more of the second playlists and one or more of the second versions of the plurality of segments are transmitted, by the video streaming service, to the recipient, for playing of a second portion of the video content, wherein the one or more of the second playlists and the one or more of the second versions of the plurality of segments correspond to the second portion of the video content. The second portion of the video content may be subsequent to the first portion of the video content. For example, as shown in FIG. 4, for transmission portion 412 (e.g., including segments 228-235), playlists and segments from transcode server 322 (e.g., including versions of segments 228-235 that are encoded using codec CD-Y) are transmitted to video player 150. Thus, in the example of FIG. 4, the second portion of the video content is transmission portion 412, which includes segments 228-235. Operation 628 may be performed based, at least in part, on the indication received at operation 626.

As described above, the video delivery service 125 may fetch the one or more of the second playlists and the one or more of the second versions of the plurality of segments from the transcode server 321, and the one or more of the second playlists and the one or more of the second versions of the plurality of segments may then be transmitted to video player 150. In some examples, the one or more of the second playlists and the one or more of the second versions of the plurality of segments may be transmitted to the recipient based at least in part on the second information in the video content stream-to-transcode server mapping. For example, prior to fetching the one or more of the second playlists and the one or more of the second versions of the plurality of segments from transcode server 321, the video delivery service 125 may consult the mapping 126 to identify that transcode server 322 is producing a the video stream for the video content 101 encoded using the second codec (e.g., CD-Y).

Figure 7:
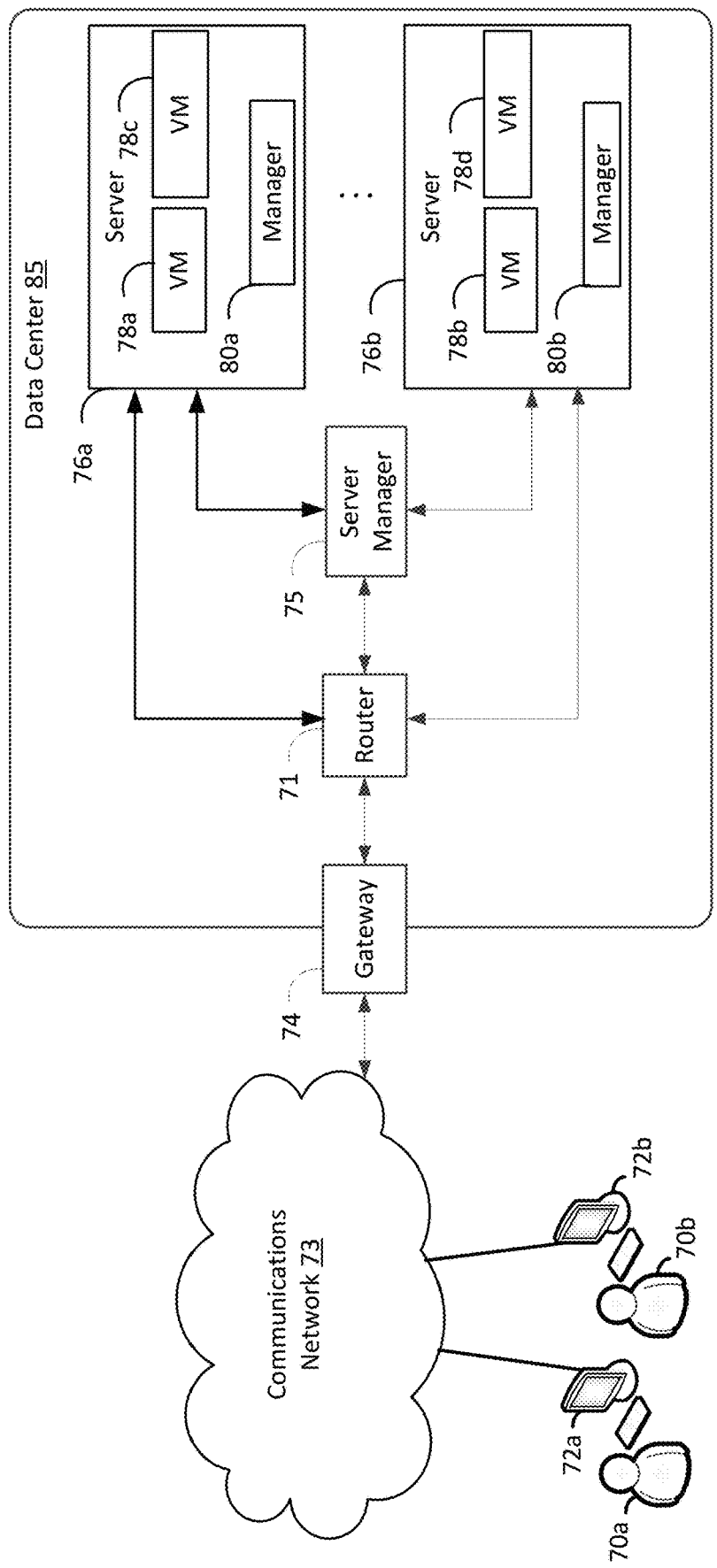
FIG. 7 is a diagram illustrating an example system for transmitting and providing data that may be used in accordance with the present disclosure.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
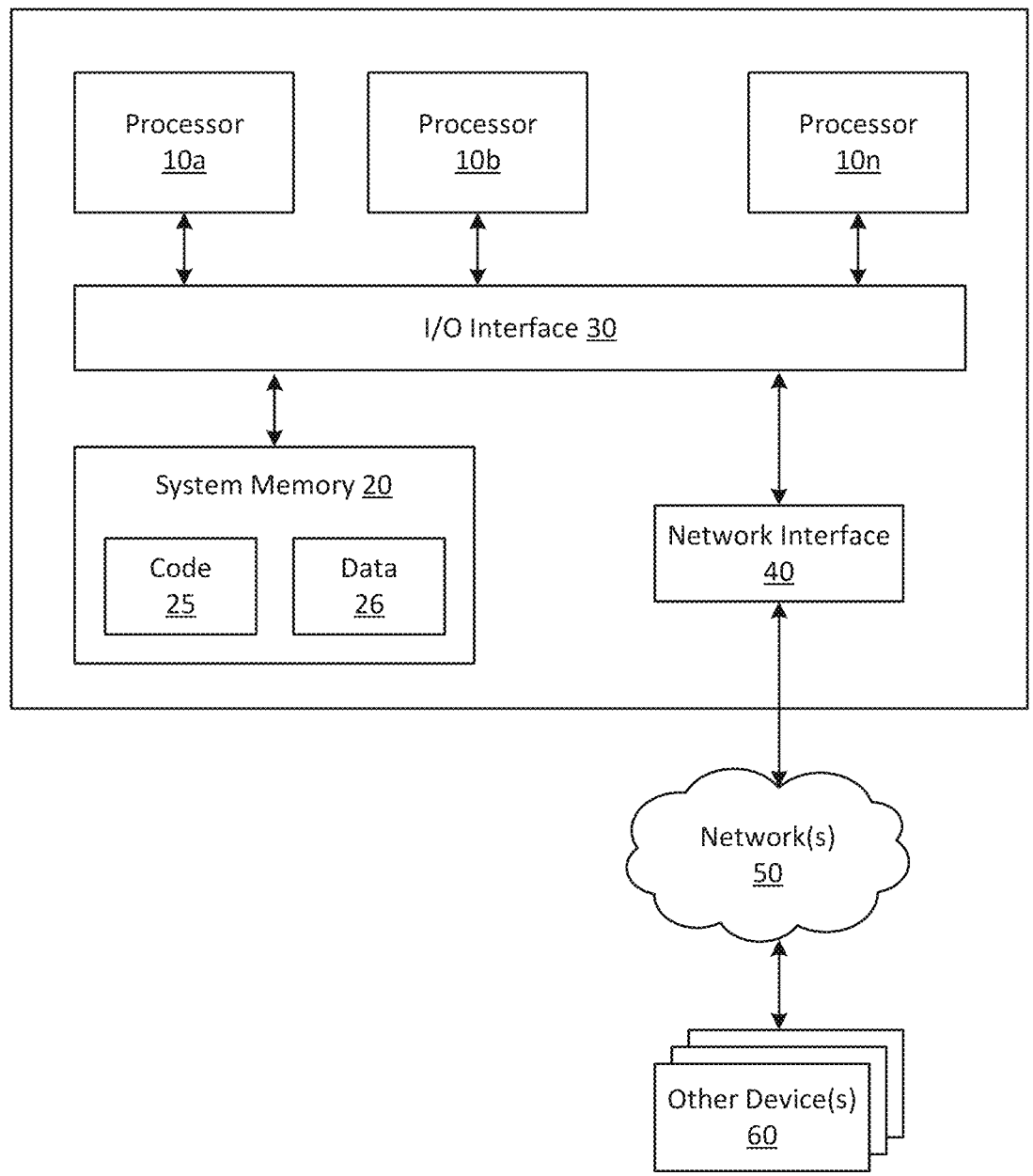
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored thereon instructions that, when executed by the one or more processors, cause the computing system to perform operations comprising:
receiving, by a video streaming service, video content from a video content source;
generating, by a segmentation component of the video streaming service, metadata indicating a plurality of starting locations for a plurality of segments of the video content that are produced during transcoding of the video content;
producing, by a first transcode server of the video streaming service, based on the metadata from the segmentation component, first playlists and first segments of the plurality of segments, wherein the first playlists allow requesting of the first segments, and wherein the first playlists and the first segments correspond to a first portion of the video content;
transmitting, by the video streaming service, the first playlists and the first segments to a recipient for playing of the first segments;
receiving an indication to perform a transcode server switch for the video content;
producing, by a second transcode server of the video streaming service, based on the metadata from the segmentation component, second playlists and second segments of the plurality of segments, wherein the second playlists allow requesting of the second segments, wherein the second playlists and the second segments correspond to a second portion of the video content that is subsequent to the first portion of the video content, wherein the first transcode server does not operate on at least part of the second portion of the video content, and wherein the second transcode server does not operate on at least part of the first portion of the video content; and
transmitting, by the video streaming service, the second playlists and the second segments to the recipient for playing of the second segments.

2. The computing system of claim 1, wherein the indication is based at least in part on a determination to switch a transcode configuration of the video content.

3. The computing system of claim 1, wherein the indication is based at least in part on a determination to remove the first transcode server from operation.

4. The computing system of claim 1, wherein the video content is live streaming video content that is transmitted and played using live streaming techniques.

5. A computer-implemented method comprising:
receiving, by a video streaming service, video content from a video content source;
generating, by a segmentation component of the video streaming service, metadata indicating a plurality of starting locations for a plurality of segments of the video content that are produced during transcoding of the video content;
producing, by a first transcode server of the video streaming service, based on the metadata from the segmentation component, first playlists and first segments of the plurality of segments, wherein the first playlists allow requesting of the first segments, and wherein the first playlists and the first segments correspond to a first portion of the video content;
transmitting, by the video streaming service, the first playlists and the first segments to a recipient for playing of the first segments;
receiving an indication to perform a transcode server switch for the video content;
producing, by a second transcode server of the video streaming service, based on the metadata from the segmentation component, second playlists and second segments of the plurality of segments, wherein the second playlists allow requesting of the second segments, and wherein the second playlists and the second segments correspond to a second portion of the video content that is subsequent to the first portion of the video content; and
transmitting, by the video streaming service, the second playlists and the second segments to the recipient for playing of the second segments.

6. The computer-implemented method of claim 5, wherein the first transcode server does not operate on at least part of the second portion of the video content.

7. The computer-implemented method of claim 6, and wherein the second transcode server does not operate on at least part of the first portion of the video content.

8. The computer-implemented method of claim 5, wherein the indication is based at least in part on a determination to switch a transcode configuration of the video content.

9. The computer-implemented method of claim 5, wherein the indication is based at least in part on a determination to remove the first transcode server from operation.

10. The computer-implemented method of claim 5, further comprising:
adding first information to a video content stream-to-transcode server mapping that indicates that the first transcode server is producing a video stream for the video content; and
after the second transcode server begins producing the second segments, adding second information to the video content stream-to-transcode server mapping that indicates that the second transcode server is producing the video stream for the video content.

11. The computer-implemented method of claim 10, wherein the first playlists and the first segments are transmitted to the recipient based at least in part on the first information in the video content stream-to-transcode server mapping, and wherein the second playlists and the second segments are transmitted to the recipient based at least in part on the second information in the video content stream-to-transcode server mapping.

12. The computer-implemented method of claim 10, wherein the video content stream-to-transcode server mapping is maintained by a video delivery service that fetches the first segments from the first transcode server and the second segments from the second transcode server.

13. The computer-implemented method of claim 5, wherein the video content is live streaming video content that is transmitted and played using live streaming techniques.

14. The computer-implemented method of claim 5, wherein the segmentation component is external to the first transcode server and the second transcode server.

15. The computer-implemented method of claim 5, wherein the segmentation component is operated by an ingest service.

16. One or more non-transitory computer-readable storage media having stored thereon computing instructions that, upon execution by a computing system, cause the computing system to perform operations comprising:
  receiving, by a video streaming service, video content from a video content source;
  generating, by a segmentation component of the video streaming service, metadata indicating a plurality of starting locations for a plurality of segments of the video content that are produced during transcoding of the video content;
  producing, by a first transcode server of the video streaming service, based on the metadata from the segmentation component, first playlists and first segments of the plurality of segments, wherein the first playlists allow requesting of the first segments, and wherein the first playlists and the first segments correspond to a first portion of the video content;
  transmitting, by the video streaming service, the first playlists and the first segments to a recipient for playing of the first segments;
  receiving an indication to perform a transcode server switch for the video content;
  producing, by a second transcode server of the video streaming service, based on the metadata from the segmentation component, second playlists and second segments of the plurality of segments, wherein the second playlists allow requesting of the second segments, and wherein the second playlists and the second segments correspond to a second portion of the video content that is subsequent to the first portion of the video content; and
  transmitting, by the video streaming service, the second playlists and the second segments to the recipient for playing of the second segments.

17. The one or more non-transitory computer-readable storage media of claim 16, wherein the operations further comprise:
  adding first information to a video content stream-to-transcode server mapping that indicates that the first transcode server is producing a video stream for the video content; and
  after the second transcode server begins producing the second segments, adding second information to the video content stream-to-transcode server mapping that indicates that the second transcode server is producing the video stream for the video content.

18. The one or more non-transitory computer-readable storage media of claim 17, wherein the first playlists and the first segments are transmitted to the recipient based at least in part on the first information in the video content stream-to-transcode server mapping, and wherein the second playlists and the second segments are transmitted to the recipient based at least in part on the second information in the video content stream-to-transcode server mapping.

19. The one or more non-transitory computer-readable storage media of claim 17, wherein the video content stream-to-transcode server mapping is maintained by a video delivery service that fetches the first segments from the first transcode server and the second segments from the second transcode server.

20. The one or more non-transitory computer-readable storage media of claim 16, wherein the segmentation component is external to the first transcode server and the second transcode server.

* * * * *